United States Patent [19]

Sakamoto

[11] Patent Number: 4,631,703
[45] Date of Patent: Dec. 23, 1986

[54] SHIFT CIRCUIT FOR DOUBLE WORD LENGTH DATA

[75] Inventor: Tsutomu Sakamoto, Tokyo, Japan

[73] Assignee: Tokyo Shibaura Denki Kabushiki Kaisha, Kawasaki, Japan

[21] Appl. No.: 484,865

[22] Filed: Apr. 14, 1983

[30] Foreign Application Priority Data

Apr. 22, 1982 [JP] Japan .................................. 57-67932

[51] Int. Cl.⁴ .............................................. G06F 7/00
[52] U.S. Cl. ...................................................... 364/900
[58] Field of Search ... 364/200 MS File, 900 MS File; 377/69, 64, 75

[56] References Cited

U.S. PATENT DOCUMENTS

| | | | |
|---|---|---|---|
| 3,436,737 | 4/1969 | Iverson et al. | 364/900 |
| 3,510,846 | 5/1970 | Goldschmidt et al. | 364/900 |
| 3,747,070 | 7/1973 | Huttenhoff | 364/900 |
| 3,790,960 | 2/1974 | Amdahl et al. | 364/900 |
| 3,967,101 | 6/1976 | Fett | 235/152 |
| 4,122,534 | 10/1978 | Cesaratta | 364/900 |
| 4,139,899 | 2/1979 | Tulpule et al. | 364/900 |
| 4,224,676 | 9/1980 | Appelt | 364/712 |
| 4,472,788 | 9/1984 | Yamazaki | 364/900 |
| 4,490,809 | 12/1984 | Ueda et al. | 364/900 |

FOREIGN PATENT DOCUMENTS 0055126  6/1982  European Pat. Off.
2745451  4/1978  Fed. Rep. of Germany

OTHER PUBLICATIONS

National Semiconductor, *CMOS Databook* 1981, p. 1:47.
Sippl, Charles and Roger, *Computer Dictionary and Handbook*, Howard W. Sams & Co., Indianapolis 1980, p. 452.

*Primary Examiner*—Gareth D. Shaw
*Assistant Examiner*—Jonathan C. Fairbanks
*Attorney, Agent, or Firm*—Kenyon & Kenyon

[57] ABSTRACT

According to a shift circuit of the present invention, two single-word length data shifters of $2^n$ bits are arranged in parallel. Further, a selective output section is provided to selectively supply the upper $2^n$ bits or the lower $2^n$ bits of the double-word length data of $2^{n+1}$ bits, sign of the data and constant to an individual section in accordance with the number of the shift and the type of shift such as the shift direction, arithmetic shift or logical shift. One shifter produces the upper $2^n$ bits of the shifted data as a result of the shift operation of the double-word length data of $2^{n+1}$ bits, and the other shifter produces the lower $2^n$ bits thereof while the two shifters operate independently in accordance with the same contents of a shifting number register.

2 Claims, 3 Drawing Figures

SHIFT CIRCUIT FOR DOUBLE WORD LENGTH DATA

BACKGROUND OF THE INVENTION

The present invention relates to a shift circuit used in an arithmetic control section in a data processing system.

There are two principal methods of shifting data: sequentially, bit by bit, or in units of several bits, in response to a synchronized signal such as a clock signal utilizing a shift register or a data multiplexer, and a method of shifting a desired amount of data in one clock signal or in one machine cycle using a multi-stage data multiplexer. Normally, the latter is adopted when a high-speed operation is required.

FIG. 1 shows a conventional shift circuit using a multi-stage multiplexer. The shift circuit in FIG. 1 performs a right or left shift operation of data X which has a 32-bit unit length in the range of 0 through 31 bits. Data having a 16-bit unit length may also be shifted in a circuit similar to that described above. A 32-bit data register 10 stores data X. A 32-bit data register 20 stores data Y which is shifted from the left or the right side thereof. If a logical shift operation is performed, Y=0 (all "0") is set, and if an arithmetic right shift operation is performed Y=S is set in the register 20. In this example, S denotes a sign of the data X.

A shifter 30 comprises data multiplexers 31, 32, 33 (hereinafter referred to as DMPX) which are connected in a multi-stage manner (in this example 3 stages). The shifter 30 has 32-bit inputs A, B and a 32-bit output C. The shifter 30 outputs 32-bit shifted data from the output C in accordance with the contents X of the register 10 which is input to the input A and the contents Y of the register 20 which is input to the input B. The DMPX 31 performs a shift operation in the left direction in units of 0, 16, 32 and 48 bits. The DMPX 32 performs a shift operation in the left direction in units of 0, 4, 8 and 12 bits. Further, the DMPX 33 performs a shift operation in the left direction in units of 0, 1, 2 and 3 bits. Now the construction of the DMPX will be described with reference to the DMPX 31 in FIG. 2.

The DMPX 31 has a function of selecting 4 positions of data ($X_{0-15}$, $X_{16-31}$, $Y_{0-15}$, $Y_{16-31}$) each of which is spaced apart by 16 bits so as to perform a left shift operation of 0, 16, 32 and 48 bits. The selection of the four positions is performed by the selecting switches S1 through S4 which are shown in FIG. 2. The linked data (64 bits) of the outputs from the selecting switches S1 through S4 is circularly shifted by 0, 16, 32 and 48 bits in one direction (the left direction) in accordance with the received data (64 bits) at the inputs A and B. In this case, the required number of bits to be input to the succeeding stage DMPX 32 will be 47 bits so that the switch S4 is unnecessary. Furthermore, the contents to be input to the switch S3 will be $Y_{0-14}$, $Y_{16-20}$, $X_{0-14}$ and $X_{16-30}$, of which the least significant bit is deleted from $Y_{0-15}$, $Y_{16-31}$, $X_{0-15}$ and $X_{16-31}$, respectively. The DMPX 32 selects 4 positions of data, each of which is spaced apart by 4 bits. The DMPX 32 performs a shift operation of 47 bit data supplied from the DMPX 31 in the left direction in any of the units of 0, 4, 8 and 12 bits to produce the upper 35 bit data to the DMPX 33. The DMPX 33 has a function of selecting 4 positions of data each of which is spaced apart by 1 bit. The DMPX 32 performs a shift operation of 35 bit data supplied from the DMPX 32 in the left direction in any of the units of 0, 1, 2 and 3 bits to produce 32 bit data to the output C.

The register 40 stores 6-bit shifting number data N which specifies the number of the shift in the left direction to the shifter 30. The lower 2 bits of the data N specify the four selecting positions of the DMPX 33. That is, the two bits "00", "01", "10" and "11" specify 0-bit, 1-bit, 2-bit and 3-bit shift-left operations, respectively. The two bits succeeding the lower two bits of the data N specify four positions of the DMPX 32. That is, the two bits "00", "01", "10" and "11" specify 0-bit, 4-bit, 8-bit and 12-bit shift-left operations, respectively. Further, the upper 2 bits of the data N specify 4 selecting positions of the DMPX 31. That is, the two bits "00", "01" "10" and "11" specify 0-bit, 16-bit, 32-bit and 48-bit shift-left operations, respectively. To perform a shift-left operation of the data X ($X_{0-31}$) having a unit length of 32 bits by a desired number of bits m in the range of 0 through 31 bits ($0 \leq m \leq 31$), the desired number of shifts m may be set in the shifting number register 40. As described above, the shifter 30 has a function of circular-shifting in one direction (in the left direction). To perform a shift-right operation of m bits ($0 < m \leq 31$), $2^6 - m$ ($=64-m$) may be set in the shifting number register 40. That is, an arbitrary shift-left operation of 0 through 31 bits can be performed by setting the number N in the range of 0 through 31 (in binary notation "000000" through "011111") in the shift register 40. Similarly, an arbitrary shift-right operation of 1 through 31 bits can be performed by setting the number N in the range of 64-1 through 64-31 (in binary notation "111111" through "100001").

For example, to perform a shift-right operation of 5 bits, the N of $2^6 - 5 = 59$ is set in the shifting number register 40 to cause the shifter 30 to perform the shift-left operation of 59 bits which is equivalent to the shift-right operation of 5 bits. That is, N=59 notates "111011" in binary form. The DMPX 31 through 33 perform shift-left operations of 48 bits, 8 bits and 3 bits, respectively, to produce data which is shifted by 59 bits in the left direction, that is, shifted by 5 bits in the right direction from the output C.

To construct a shift circuit of double word length data of 64 bits utilizing single word length data of 32 bits, the capacity of the registers 10 and 20 may be extended to twice the bit width of the registers in FIG. 1, that is to 64 bits. Further, the bit width of the inputs A, B and the output C may also be extended to 64 bits. The bit width of the shifting register 40 may also be extended from 6 bits to 7 bits.

However, this method of constructing a shift circuit for double word length data has the following drawbacks:

I. If such an extension is realized by utilizing two shift circuits in FIG. 1 which perform shift operations of single word length, complicated connections will result from the increased signal lines for connecting these two circuits. This can be seen from the construction of the DMPX 31 in FIG. 2. For example, to construct a DMPX which performs shift-left operations of 0 bit, 16 bits, 32 bits, 48 bits, 64 bits, 80 bits, 96 bits and 112 bits using two DMPX 31s, 1024 signal lines [8 (positions)×16 (bits/position)×(128/16)] are required to realize a selecting function of 8 positions which are spaced apart by 16 bits. This number of lines is extremely large compared to 256 lines [4 (positions)×16 (bits/position)×(64/16)] in the DMPX 31 in FIG. 2.

II. Even if an LSI (Large Scale Integrated) circuit including the double-word length shift circuit could be manufactured in theory, the actual mounting on the package would be difficult because of the increased number of I/0 pins.

SUMMARY OF THE INVENTION

An object of the present invention is to provide a shift circuit which can easily construct a double word length data shifter of $2^{n+1}$ bits based on a single word length (=unit length) data shifter and which facilitates large scale integration.

According to the present invention, the following advantages can be obtained:

I. The shift operation of the double word length data can be performed while two shifters functioning as single word length data shifters operate independently.

II. No signal connections are required between the two single word length data shifters, thereby obtaining flexible circuit constructions and large scale integration.

III. The shifting number register in which the shifting number data N is stored can be used in both the single word length data shift operation and the double word length data shift operation, thereby obtaining simplified control of the shift circuit.

BRIEF DESCRIPTION OF THE DRAWINGS

Other objects and features of the present invention will be described in connection with the accompanying drawings in which.

DETAILED DESCRIPTION OF THE PREFERRED EMBODIMENTS

Figure 1:
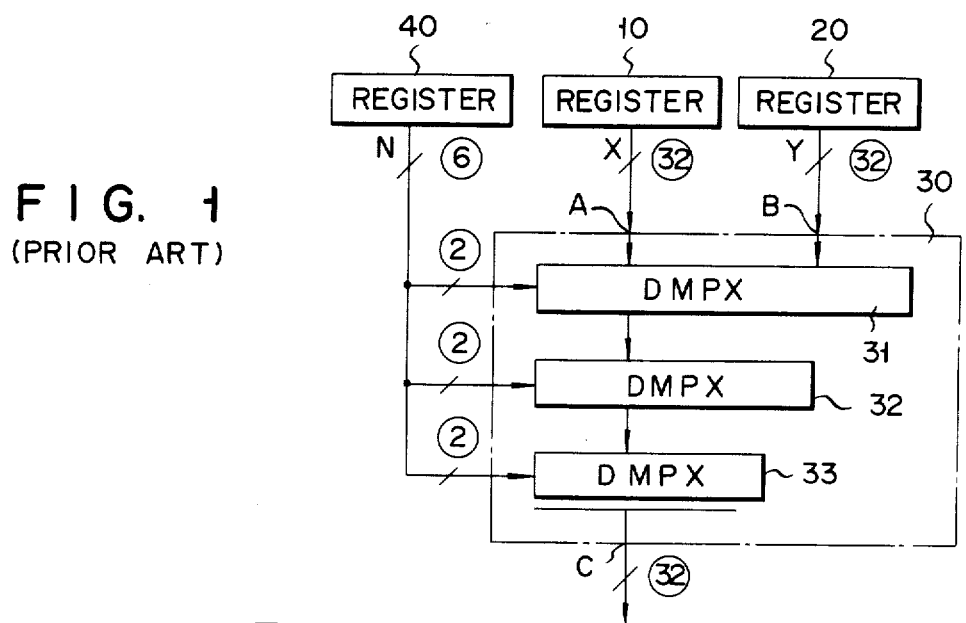
FIG. 1 is a block diagram showing a conventional shift circuit.
Figure 3:
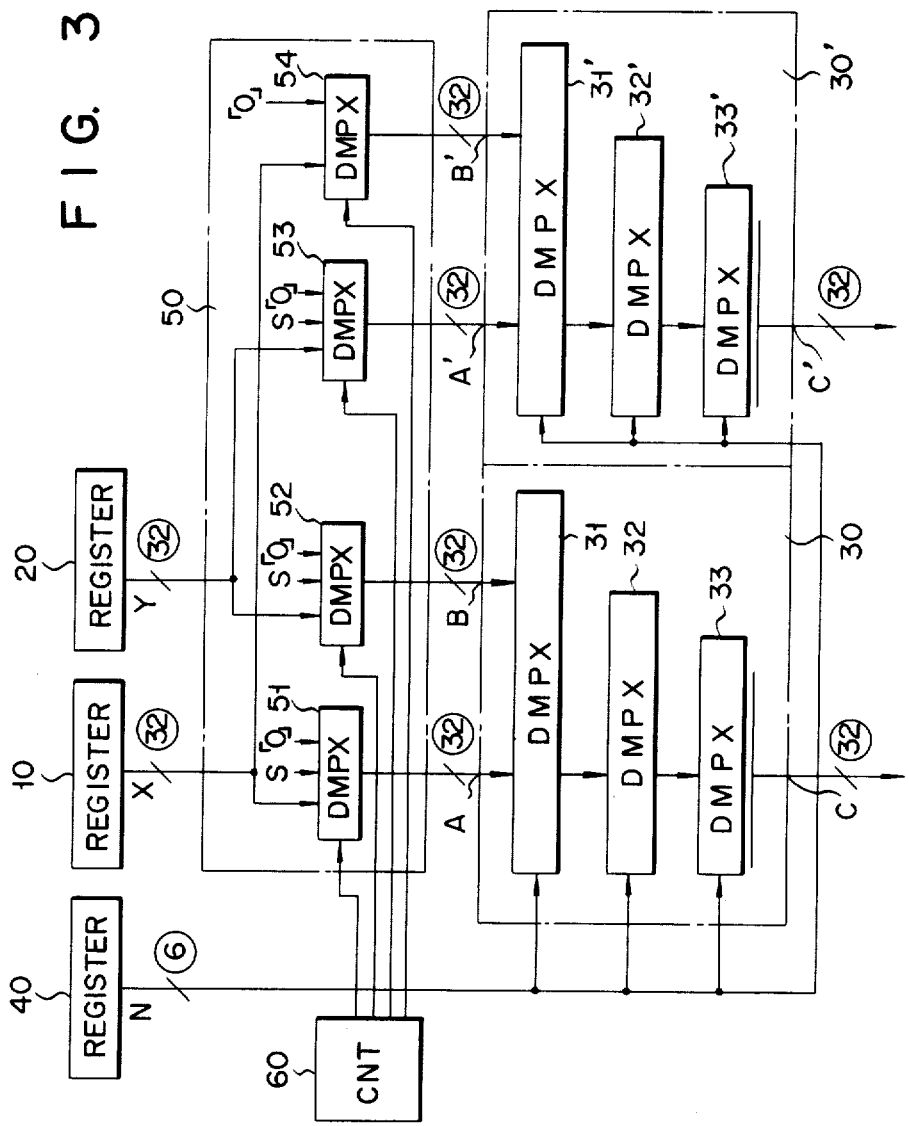
FIG. 3 is a block diagram showing a shift circuit of the present invention.

Now an embodiment of the present invention will be described with reference to the drawings. The same numerals are used for the same parts in FIG. 1, and so a detailed description of these parts will be omitted. In FIG. 3, a shifter 30' is similar in construction to the shifter 30 (a single word length data shifter) in FIG. 1 and is provided with DMPXs 31' through 33'. These DMPXs 31' through 33' also have a construction similar to the DMPXs 31 through 33 in FIG. 1. The shifter 30' is provided with 32-bit inputs A' and B' and a 32-bit output C'. The shifters 30 and 30' shift the input to the left by the value (shifting number N) which is designated in the 6-bit shifting number register 40.

A selective output section 50 is provided with DMPXs (data multiplexers) 51 through 54. The DMPX 51 selectively outputs any of the contents X (32 bits) of the data register 10, sign S (32 bits) of the data X or constant "0" (all "0" data of 32 bits) to the input A of the shifter 30. The DMPX 52 selectively outputs any of the contents Y (32 bits) of the data register 20, signs of the data X or constant "0" to the input B of the shifter 30. The DMPX 53 selectively outputs the contents Y of the register 20, sign S of the data X or constant "0" to the input A' of the shifter 30'. The DMPX 54 selectively outputs the contents of the register 10 or constant "0" to the input B' of the shifter 30'. A control section 60 (hereinafter referred to as CNT) controls the DMPXs 51 through 54. The CNT 60 outputs selection signals corresponding to the shifting number (shift bit number) m, the shift direction, and the arithmetic/logic shift operation to control the DMPXs 51 through 54. The DMPXs 51 through 54 perform selective operations in response to the selection signal supplied from the CNT 60. In this embodiment, the CNT 60 controls the DMPXs 51 through 54 in such a way that the contents of the DMPXs 51 through 54 which are selectively output in accordance with the various shift conditions (shifting number m and type of shift operation) satisfy the following table, the outputs being the input contents of the inputs A, B, A', B' of the shifters 30, 30'.

TABLE

| Type of shift operation | m | A | B | A' | B' |
|---|---|---|---|---|---|
| Left arithmetic/logic | ≦31 | X | Y | Y | 0 |
| " | ≧32 | 0 | Y | 0 | 0 |
| Right logic | ≦31 | X | 0 | Y | X |
| " | ≧32 | 0 | 0 | 0 | X |
| Right arithmetic | ≦31 | X | S | Y | X |
| " | ≧32 | S | S | S | X |

In the above table, m≦31 means the shifting number is in the range of 0 through 31 bits and m≧32 means that the shifting number is in the range of 32 through 63 bits.

As an example suppose that data X, which is the upper 32 bits of the 64-bit double-word length data, is stored in the data register 10 and that data Y, which is the lower 32 bits thereof, is stored in the data register 20. Under this condition, in order to perform a shift-right operation of the 64-bit double-word length data by m bits, 64−m as the shifting number N is stored in the shifting number register 40, as is the case in the prior art independent of the arithmetic shift operation or the logic shift operation. To perform the shift-left operation by m bits, N=m is set in the shifting number register 40. For example, to perform the arithmetic shift operation of the 64-bit double-word length data in the right direction by 16 bits (m=16), 48 is set as N in the shifting number register 40. (N=64−m=64−16=48) It is apparent from the table that when the arithmetic shift-right operation is performed and m≦31 is satisfied, the contents of the selective outputs of the DMPXs 51 through 54 which are selectively operated under the control of the CNT 60, that is, the contents to be received at the inputs A, B, A' and B' of the shifters 30 and 30', are A=X, B=S, A'=Y and B'=X.

The shifter 30 performs the circular shift operation of the data X (32 bits) and sign S (32 bits) which are input to the inputs A and B in the left direction by 48 bits in accordance with the contents N (=48) of the shifting number register 40. The N=48 reads "110000" in binary form, and the DMPX 31 produces data shifted in the left direction by 48 bits to the DMPX 32. The DMPXs 32 and 33 perform no shift operations. Therefore, if $X_{0-15}$ is supposed to be the upper 16 bits of the 32-bit data X, the contents of the 32-bit output data from the DMPX 33, that is, the contents of the output C of the shifter 30 result in

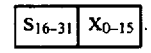

The result is the shifted data of the upper 32 bits achieved by the 16-bit arithmetic shift-right operation of the 64-bit double word length data. Similarly, the shifter 30' performs the circular shift operation of 32-bit data Y and 32-bit data X which are input to the inputs A' and B' in the left direction by 48 bits. When the $X_{15-31}$ is supposed to be the lower 16 bits of the 32-bit data X and the $Y_{0-15}$ is supposed to be the upper 16 bits of the 32-bit data Y, the content of the output C' of the shifter 30 becomes

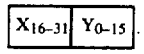

The result is the shifted data of the lower 32 bits achieved by the 16-bit arithmetic shift-right operation of the 64-bit double word length data. The linked data of

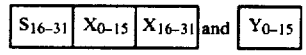

from the outputs C and C' of the shifters 30 and 30', that is

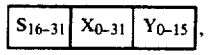

is the result of the 16-bit arithmetic shift-right operation of the 64-bit double word length data.

Figure 2:
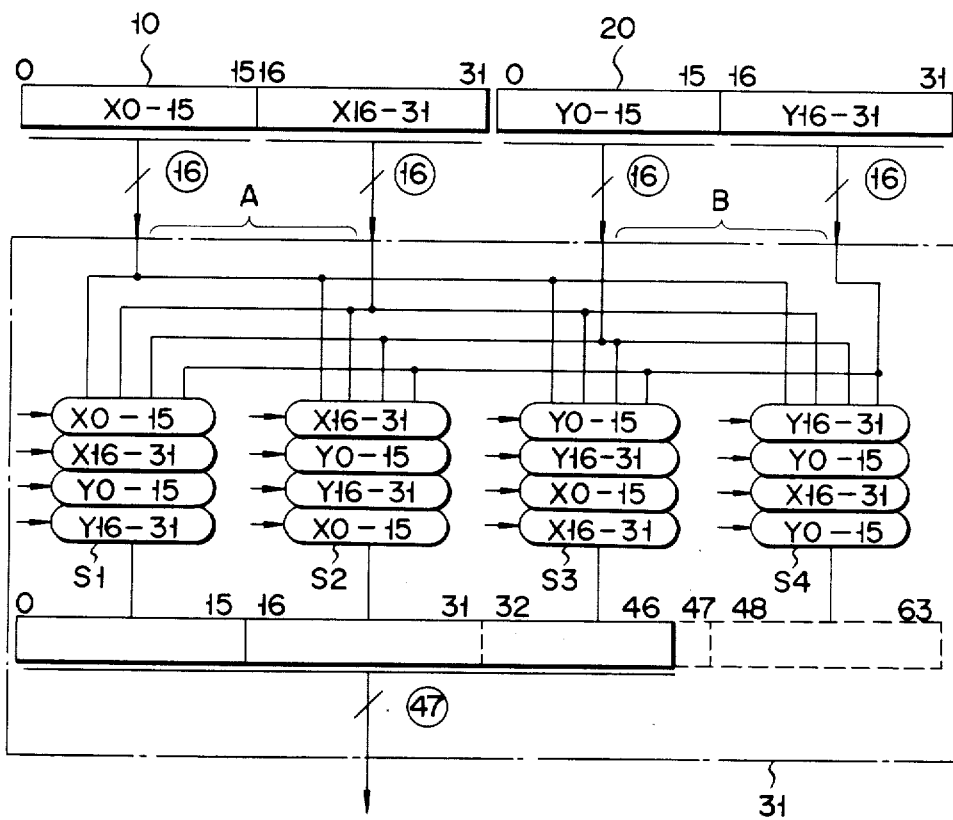
FIG. 2 is a block diagram showing a data multiplexer having a shift function.

In the above embodiment, the 16-bit arithmetic shift-right operation of the 64-bit double word length data has been performed. However, it is apparent from the construction of FIG. 2 that all types of shift operations (shift-left or shift-right, arithmetic or logic shift operations) can be performed in the range of 0 through 63 bits. In this case, the sign S or the constant "0" may only be set in the register 20 as in the case of the prior art. Then, the contents (Y) of the register 20 may be selectively output from the DMPX 52 to the input B of the shifter 30. In this case, the sign S or the constant "0" can still be set in the register 20. As is apparent, the shifter 30 is not used when the shift operation of the single-word length data is performed.

When the arithmetic shift-left operation is performed, the sign S is not included in the result C at m≠0. Therefore, the sign should be added after the operation. However, such an adding operation is not directly related to the present invention, and its description will be omitted.

In the embodiment, the data shift has been performed for all types of shift operations (left or right shift operations, arithmetic or logic shift operations). However, the number of parameters to be input to the DMPXs 51 through 54 decreases when the types of shift operations are limited such that the shift direction is limited to left or right only, or the type of shift operation is limited to the arithmetic shift operation or to the logic shift operation. Further, in the embodiment, a shift circuit has been described in which double word length data of 64 bits ($2^6$ bits) is shifted when the single word length data comprises 32 bits, that is, $2^5$ bits. However, it is apparent that the shift circuit of the present invention can be applied to the 16-bit single word length data and 32-bit double word length data. The present invention can be applied to the data shift operation of the single word length data of $2^n$ bits (n: Integer) and double word length data of $2^{n+1}$ bits in the range of 0 through $2^{n-1}$ bits and 0 through $2^{n+1}$ bits.

What is claimed is:

1. A shift circuit comprising:

a shift number designation register for storing (n+1)-bit shift number information (n: a positive integer) representing the number of shifts;

shift type specifying means for specifying shifting directions and types of arithmetic/logic operations;

first and second data registers for respectively storing the higher $2^n$ bits and the lower $2^n$ bits of $2^{n+1}$-bit data;

a first data multiplexer, coupled to said first data register and shift type specifying means, for selecting one of the content of said first data register and at least one of a $2^n$-bit constant and a $2^n$-bit sign, in accordance with the shift type information from said shift type specifying means;

a second data multiplexer, coupled to said second data register and shift type specifying means, for selecting one of the content of said second data register and at least one of a $2^n$-bit constant and a $2^n$-bit sign, in accordance with the shift type information from said shift type specifying means;

a third data multiplexer, coupled to said second data register and shift type specifying means, for selecting one of the content of said second data register, a $2^n$-bit constant and a $2^n$-bit sign, in accordance with the shift type information from said type specifying means;

a fourth data multiplexer, coupled to said first data register and shift type specifying means, for selecting one of the content of said first data register and a $2^n$-bit constant, in accordance with the shift type information from said shift type specifying means; and first and second shifters, coupled to said shift number designation register and said first to fourth data multiplexers and having input sections to which $2^n$-bit data from said first and second data multiplexers and $2^n$-bit data from said third and fourth data multiplexers are respectively supplied, for performing data shifting only in one direction, either to the left or the right, within a shifting range of 0 to $2^n-1$ bits in accordance with the shift number information from said shift number designation register, thereby providing a $2^n$-bit shift output.

2. The shift circuit according to claim 1, wherein when the type of the shift is a rotated-left-shift and an arithmetic/logic shift and the number of shifts, m, is given as m≦$2^n$-1, said first through fourth data multiplexers respectively output X, Y, Y and O, where X is the content of said first data register, Y is the content of said second data register and O represents zero; when the type of the shift is a rotated-left-shift and an arithmetic/logic shift and m≦$2^n$, said first through fourth data multiplexers respectively output O, Y, O and O; when the type of the shift is a rotated-right-shift and a logic shift and m≧$2^n$-1, said first through fourth data multiplexers respectively output X, O, Y and X; when the type of the shift is a rotated-right-shift and a logic shift and m≦$2^n$-1, said first through fourth data multiplexers respectively output X, O, Y and X; when the type of the shift is a rotated-right-shift and a logic shift and m≧$2^n$, said first through fourth data multiplexers respectively output O, O, O and X; when the type of the shift is a rotate-right shift and an arithmetic shift and m≦$2^n$-1, said first through fourth data multiplexers respectively output X, S, Y and X, where S is the sign of X; and when the type of the shift is a rotated-right-shift and an arithmetic shift and m≧$2^n$, said first through fourth data multiplexers respectively output S, S, S and X.

* * * * *